Aug. 25, 1959

G. W. WRIGHT 2,901,000

VALVE ASSEMBLY

Filed July 22, 1954

INVENTOR.
GEORGE W. WRIGHT,
BY
Schley, Zash & Jenkins
ATTORNEYS.

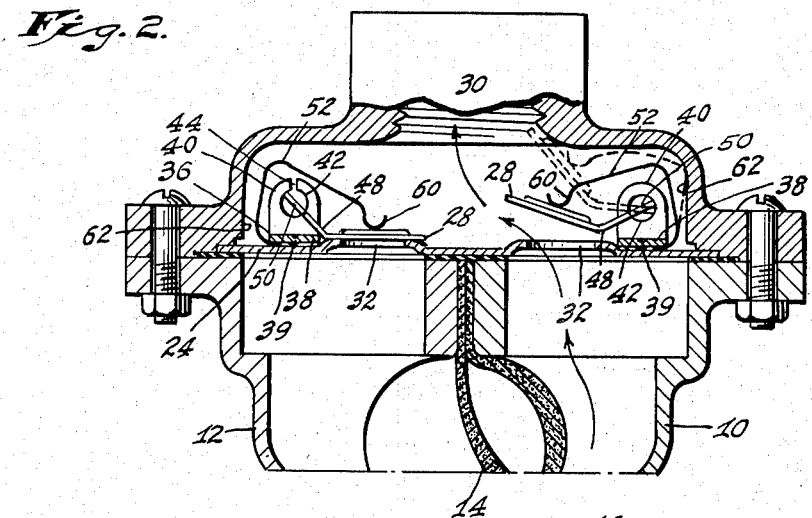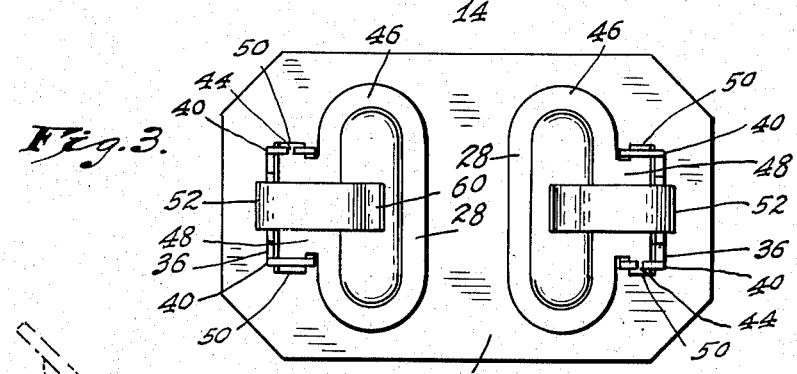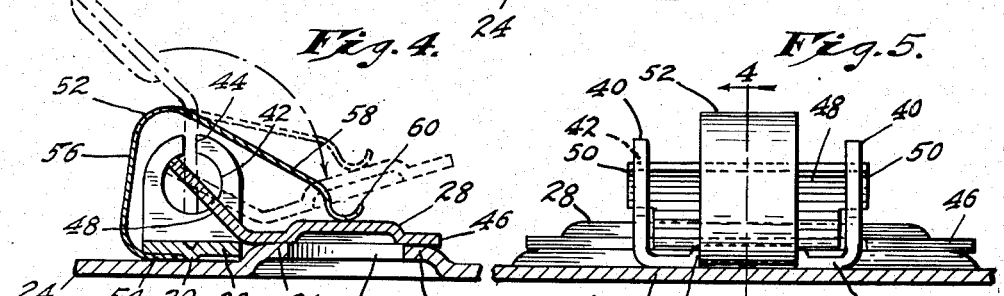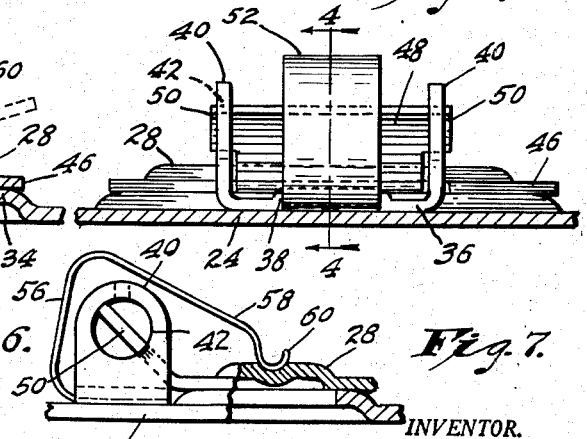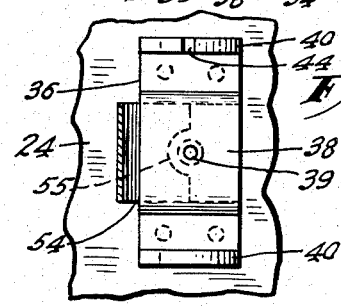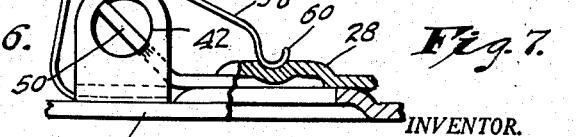

United States Patent Office 2,901,000
Patented Aug. 25, 1959

2,901,000

VALVE ASSEMBLY

George W. Wright, Yoder, Ind., assignor to Tokheim Corporation, Fort Wayne, Ind., a corporation of Indiana Application July 22, 1954, Serial No. 445,030

5 Claims. (Cl. 137—527)

This invention relates to a valve assembly in a diaphragm pump. This application is a continuation-in-part of my co-pending application Serial No. 221,848, filed April 19, 1951, on which Patent No. 2,685,304 issued on August 3, 1954.

It is the object of the invention to provide a valve structure which is simple and inexpensive in construction and assembly, which may be made from sheet metal, which forms a tight seal when closed, and which as a unitary sub-assembly can readily be embodied in a unit of a larger assembly; and to combine such valve structure in a diaphragm pump.

In accordance with the invention, a diaphragm is clamped at its edges between opposed casings which form displacement chambers on opposite sides thereof communicating respectively with fluid passages leading radially to co-planar side faces on the casings, and a single valve plate clamped against such faces by an inlet or outlet fitting provides separate valve ports for the two chambers and their respective fluid passages. The valve plate is preferably a sheet-metal plate in which the valve ports are punched. A rim is struck up or off-set from the plate about the edge of each port to provide a raised seat, which is finished to a flat surface by surface grinding or a cold forging or coining operation. Each port is closed by a valve, likewise made of sheet metal, and preferably slightly cupped to stiffen it, and formed with rim portions which are finished to a flat surface as by surface grinding or cold forging or coining. The valve is located with respect to its seat by a projecting tongue extending from the valve and pivoted to a support adjacent the seat. The tongue may be provided with upturned and punched fingers and may be mounted thereby on a pivot pin, as in my co-pending application. Preferably, the tongue is formed with laterally projecting ears which are received in pivot holes punched in a pair of upstanding supports, such as the upstanding legs of a U-shaped bracket. One or both of the ear-receiving holes may be provided with an access slot to pass the associated ear edgewise but positioned outside the normal range of edgewise positions of the ear when the valve is in use. The valve is urged to closed position by a valve spring which desirably engages the center of the valve and thus tends to seat the valve without reliance on the pivot mounting for final location, and the pivot mounting is desirably made loose to permit the spring to control the final seating. The spring may be a wire coiled about the pivot pin and having a spring finger engaged against the outer face of the valves. Preferably, however, the spring is a generally C-shaped leaf-spring, one end of which is received in a suitable retainer, preferably formed in the web of the U-shaped bracket, and the other end of which engages the central portion of the valve. The casing in which the valve is housed is desirably formed and positioned to prevent the valve spring from escaping from its retainer.

The accompanying drawings illustrate the invention. In such drawings:

Fig. 2 is an enlarged sectional view of the upper end of that pump, showing a preferred valve assembly;

Fig. 3 is a plan view of the valve assembly shown in Fig. 2;

Fig. 4 is an enlarged sectional view of the preferred form of valve structure, taken on the line 4—4 of Fig. 5;

Fig. 5 is a rear elevation of the valve structure shown in Fig. 4;

Fig. 6 is a plan view of the valve-supporting bracket shown in Figs. 4 and 5; and Fig. 7 is a fragmental view similar to Fig. 4, showing a modified form of valve body.

Figure 1:
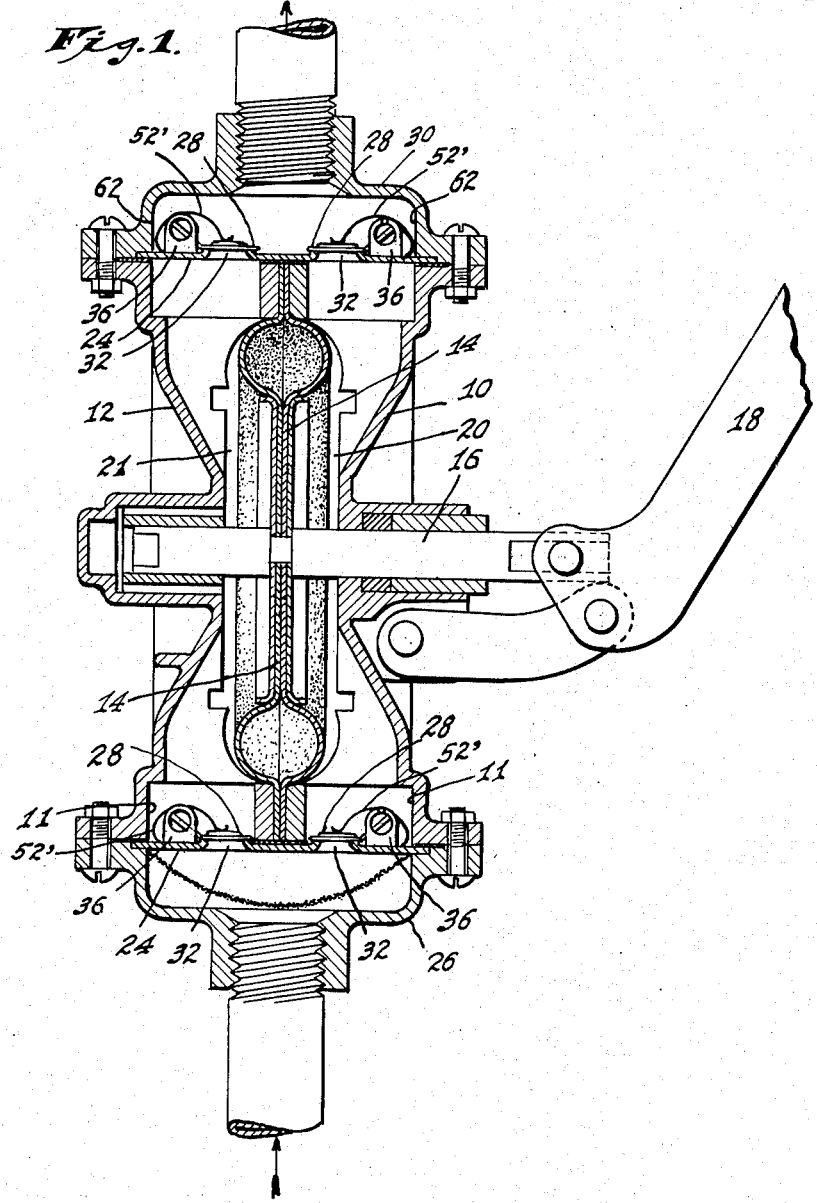
Fig. 1 is a vertical section of a manually operable diaphragm pump of the type shown in my co-pending application Serial No. 221,848, equipped with valve structure embodying the invention of this application.

The pump shown in Fig. 1 comprises a pair of front and rear casings 10 and 12 with a double-walled diaphragm 14 clamped at its edges between them. The two casings form opposite displacement chambers 20 and 21 for the diaphragm 14, and the central piston portion of the diaphragm is secured to a pump rod 16 which can be reciprocated manually by a lever 18. The pump chambers 20 and 21 on opposite sides of the diaphragm 14 are closed at the bottom by a valve plate 24 clamped at its edges between the pump casings 10—12 and an inlet fitting 26. The plate 24 carries two valves 28 which open upwardly and respectively form inlet valves for the two pump chambers.

The two pump chambers 20 and 21 are closed at the top by a similar valve plate 24, clamped at its edges between the pump casings 10—12 and an outlet fitting 30. Like the inlet plate, the outlet valve plate 24 carries two valves 28, which respectively form outlet valves for the two chambers.

As shown in Figs. 3 to 5, the valve plate 24 is a sheet-metal stamping, with generally oval valve ports 32 punched through it, and with the edge portions of the metal about those ports offset or struck upwardly to form rims 34 about the valve ports. The two rims 34 about the two ports 32 of each valve plate 24 are substantially coplanar, and their top seat faces are finished to flat surfaces, as by surface grinding or preferably by a coining operation, i.e., an accurate cold-forging operation. At the outer side of each valve-seat rim 34, a U-shaped bracket 36 is secured to the plate 24, as by spot welding. The central web portion 38 of each bracket 36 is raised, to provide between itself and the plate 24 a spring-retaining opening. Preferably, a downward projection 39 is formed at the center of the web 38 to form a locating stop for the valve spring. At each end the bracket 36 carries an upstanding leg 40 which is punched to provide a valve pivot hole 42. At least one of the legs 40 of each bracket 36 is also slotted to form an access slot 44 leading to the pivot hole 42.

Each valve 28 is formed as a sheet-metal stamping having a flat body, which is desirably slightly cupped for stiffness, with a flat rim 46 at its edge adapted to engage the valve-seat rim 34. The center of the valve may be formed to provide a depression to receive the free end of the valve spring, as in the modification shown in Fig. 7. The bottom surface of the valve rim 46 is finished to a flat surface adapted to mate with the seat on the rim 34, as by a surface-grinding operation or preferably by a coining operation. At the outer edge of each valve 28 it is provided with an integral supporting tongue 48, bent upwardly from the plane of the rim 46 and provided at its end with laterally projecting ears 50. The ears 50 are of substantially greater width than thickness, and are received loosely in the pivot holes 42. The slots 44 are of sufficient width to pass the ears 50 edgewise, but too narrow to pass the ears 50 in any other position, and are so positioned that the ears are out of edgewise alignment with the slots at all normal positions of the valve in use. As indicated in Fig. 4, a valve may be inserted and removed from its bracket 36 by moving it to the position shown in dotted lines in Fig. 4, where an ear 50 is aligned with an access slot 44 and may be moved through that slot into or out of the pivot hole 42. While both legs 40 of the bracket 36 may be provided with slots 44, I have found it sufficient to provide a slot 44 in only one of the legs 40. As shown in Figs. 4 and 5, the slot 44 is provided in the leg 40 at the left of Fig. 5.

After the valve 28 has been inserted in its supporting bracket 36 and moved to closed position, a generally C-shaped spring 52 is inserted to hold it in position and to urge it to closed position. While other spring shapes may be used, such as the curved shape of the springs 52' shown in Fig. 1, the spring 52 is desirably of the general shape shown in Fig. 4, with a bottom leg 54 adapted to be received in the retaining opening below the raised portion 38 of the bracket, with an upwardly extending portion 56 which rises to a point above the outer end of the tongue 48, and with a forwardly and downwardly extending portion 58 leading to a curved end 60 which engages the center of the valve body.

Preferably, the bottom leg 54 of the spring is normally arched to a height greater than the height of the retaining opening below the bracket web 38, so that it firmly engages the top and bottom faces of that opening to retain itself in position. The bottom leg is desirably located in its retainer by engagement of a notch 55 at its end with the stop or projection 39 on the web 38. Alternative or additional locating of the spring may be obtained by engaging the hook 60 at the free end of the spring in a depression in the top of the valve 28, as shown in Fig. 7.

As shown in Figs. 1 and 2, the valve brackets and springs are desirably located in the assembled pump at a point close to a casing wall, such as the outer wall 62 of the outlet fitting 30, so that the wall 62 lies in the path of retraction movement of the spring from its retaining opening beneath the raised portion 38 of the bracket 36. A similar spring-retaining function is performed by the position of the walls 11 adjacent the inlet valves at the bottom of the pump casings 10 and 12. In addition to this retaining function, the casing walls about the valves may provide stops which prevent movement of the valves to positions which would align their ears 50 edgewise with the access slots 44 in their supporting brackets 36. The valve 28 at the right in Fig. 2 is shown in full lines in a position of normal opening, and is shown in dotted lines in an extreme position where its opening movement is stopped by the adjacent outlet-fitting wall. Even in such extreme position, the ear 50 is still well away from a position of edgewise alignment with its access slot 44. The valves 28 are normally retained in their brackets by the springs, and the stops formed by adjacent walls provide further and positive means to retain both the valves and their springs.

The valve structures are inexpensive to form and assemble. Their parts can be produced in final form by relatively simple sheet-metal stamping operations, and the brackets 36 can be attached by spot or projection welding. The whole assembly can be made of any desired sheet-metal material, and for use in gasoline pumps, I desirably make it of stainless-steel.

Assembly of the valves 28 to the plate 24 is likewise simple and inexpensive. Where each bracket 36 contains only one access slot 44, one ear 50 of a valve is first moved axially into the closed pivot hole 42 and the other ear is then moved edgewise through the access slot 44 leading to the companion hole 42, with the valve positioned as shown in dotted lines in Fig. 4 so that its ear is presented edgewise to the slot. The valve is then swung to its closed position, and a valve spring is then slipped into place. In the modification of Figs. 4–6 the spring is located by engagement of its notch 55 with the stop 39. In the modification of Fig. 7 the curved end 60 of the spring is engaged in the depression at the center of the valve body. The assembly is now a self-sustaining assembly and can be inserted as such as the inlet and outlet fittings 26 and 30 are assembled to the pump.

In operation, each valve is biased to closed position by its spring, which exerts its spring forces at the center of the valve. The pivotal support for the valve is desirably loose, and leaves the valve free to seat itself on the seat under the spring force, and the flat valve face therefore seats accurately on the flat seat face. The slight looseness of the pivot and the relative position of the pivot produces a valve movement which tends to keep the seating faces clean and in good sealing condition.

I claim as my invention:

1. A unitary valve assembly, comprising a sheet-metal plate having a port formed therethrough, a rim about said port deformed from the plane of the plate to form a raised valve seat, a bracket carried by said plate adjacent said seat and forming a pivotal valve support on an axis substantially elevated above the plane of said seat, a sheet-metal valve member having a head seating in metal-to-metal contact on said seat and having a lateral tongue projecting from the edge thereof outward and upward from such head into loose pivotal engagement with said elevated support, and a spring engaging said head centrally of said seat to bias the valve to closed position.

2. A valve assembly according to claim 1, in which said spring is a leaf spring having a mounting portion mounted on said plate, an upstanding generally straight leg rising from said portion in spaced relation behind said pivotal axis to a point substantially above said axis, and a valve-engaging arm extending forward from said leg into engagement with the center of the valve head, whereby valve opening stress in the spring is distributed in said leg and arm to move the valve engaging end of the spring substantially in an arc about said pivotal axis.

3. A unitary valve assembly, comprising a sheet-metal plate having a port formed therethrough, a rim about said port offset from the plane of the plate to form a stiffened raised valve seat with the face of the seat on an original face portion of the plate, a bracket carried by the plate adjacent said seat, said bracket forming between itself and the plate a socket for the reception of the mounting leg of a valve spring, a pair of spaced upstanding legs on the bracket provided with alined pivot openings, a sheet-metal valve member having a head seating on said seat and a tongue projecting therefrom and provided with flat ears received in said pivot openings to pivotally support the valve member in cooperative relation with said seat, said member having a predetermined normal range of angular opening movement with respect to said bracket legs, at least one of the legs being provided with a radial slot to pass its associated ear edgewise to its pivot opening with the valve member at an insertion angle beyond its normal range of opening movement, and a generally C-shaped valve spring having a mounting leg received in said socket and biasing said valve member away from said insertion angle and toward closed position.

4. A valve assembly, comprising a plate having a port formed therethrough, a valve seat about said port, a bracket carried by the plate adjacent said seat, a pair of spaced upstanding legs on the bracket provided with aligned pivot openings, a sheet-metal valve member having a head seating on said seat and a tongue projecting therefrom and provided with flat ears received in said pivot openings to pivotally support the valve member in cooperative relation with said seat, said member having a predetermined normal range of angular opening movement with respect to said bracket legs, at least one of the legs being provided with a radial slot to pass its associated ear edgewise to its pivot opening with the valve member at an insertion angle beyond its normal range of opening movement, and a valve spring biasing said valve member away from said insertion angle and toward closed position.

5. A unitary valve assembly, comprising a sheet-metal plate having a port formed therethrough, a valve seat about said port, a bracket carried by the plate adjacent said seat, said bracket forming between itself and the plate a socket for the reception of the mounting leg of a valve spring, a pair of spaced upstanding legs on the bracket provided with aligned pivot openings, a sheet-metal valve member having a head seating on said seat and a tongue projecting therefrom and provided with ears received in said pivot openings to pivotally support the valve member in cooperative relation with said seat, said member having a predetermined normal range of angular opening movement with respect to said bracket legs, and a generally C-shaped valve spring having a mounting leg received in said socket and biasing said valve member toward closed position.

References Cited in the file of this patent

UNITED STATES PATENTS

| | | |
|---|---|---|
| 356,997 | Gil | Feb. 1, 1887 |
| 677,474 | Russell | July 2, 1901 |
| 1,673,831 | Kuehne | June 19, 1928 |
| 2,277,295 | Brown | Mar. 24, 1942 |
| 2,336,486 | Langdon | Dec. 14, 1943 |
| 2,419,318 | Johnson | Apr. 22, 1947 |

FOREIGN PATENTS

| | | |
|---|---|---|
| 6,281 | France | Oct. 26, 1850 |
| 58,590 | France | May 26, 1863 |